(12) United States Patent
Kim et al.

(10) Patent No.: US 6,820,206 B1
(45) Date of Patent: Nov. 16, 2004

(54) POWER SHARING BETWEEN PORTABLE COMPUTER SYSTEM AND PERIPHERAL DEVICE

(75) Inventors: Anthony Kim, Tracy, CA (US); Howard William Stanley, San Jose, CA (US)

(73) Assignee: palmOne, Inc., Milpitas, CA (US)

( * ) Notice: Subject to any disclaimer, the term of this patent is extended or adjusted under 35 U.S.C. 154(b) by 491 days.

(21) Appl. No.: 09/991,402

(22) Filed: Nov. 20, 2001

(51) Int. Cl.$^7$ .............................. G06F 1/26; G06F 1/32
(52) U.S. Cl. ...................... 713/300; 713/320; 713/340; 324/426; 324/427; 324/428
(58) Field of Search ................................ 713/300, 320, 713/340; 324/426, 427, 428

(56) References Cited

U.S. PATENT DOCUMENTS

| | | | | |
|---|---|---|---|---|
| 5,440,221 A | * | 8/1995 | Landau et al. | 320/155 |
| 5,638,540 A | * | 6/1997 | Aldous | 713/300 |
| 5,911,529 A | * | 6/1999 | Crisan | 400/472 |
| 5,920,728 A | * | 7/1999 | Hallowell et al. | 713/340 |
| 5,973,497 A | * | 10/1999 | Bergk et al. | 324/428 |
| 6,107,802 A | * | 8/2000 | Matthews et al. | 324/427 |

* cited by examiner

Primary Examiner—Rehana Perveen
(74) Attorney, Agent, or Firm—Wagner, Murabito & Hao LLP

(57) ABSTRACT

A method and apparatus that allows for controlling operating time of a portable computer system and a peripheral device. A portable computing system that includes a rechargeable power supply and that includes a connection mechanism for coupling to a peripheral device is used to control operating time of the portable computer system and the peripheral device. In one embodiment, a user can choose between maximizing the operating time of the portable computer, maximizing the operating time of the peripheral device, or maximizing the life of the entire system (maximizing the operating time of the portable computer system and the peripheral device). When operating time of the portable computer system is to be maximized, power is sent from the peripheral device to the portable computer system to extend the operating time of the portable computer system. Similarly, when operating time of the peripheral device is to be maximized, power is sent from the rechargeable power supply of the portable computer system to the peripheral device to extend the operating time of the peripheral device. When operating time of the entire system is to be maximized, power is moved such that the operating time for the portable computer system is equal to the operating time of the peripheral device.

22 Claims, 9 Drawing Sheets

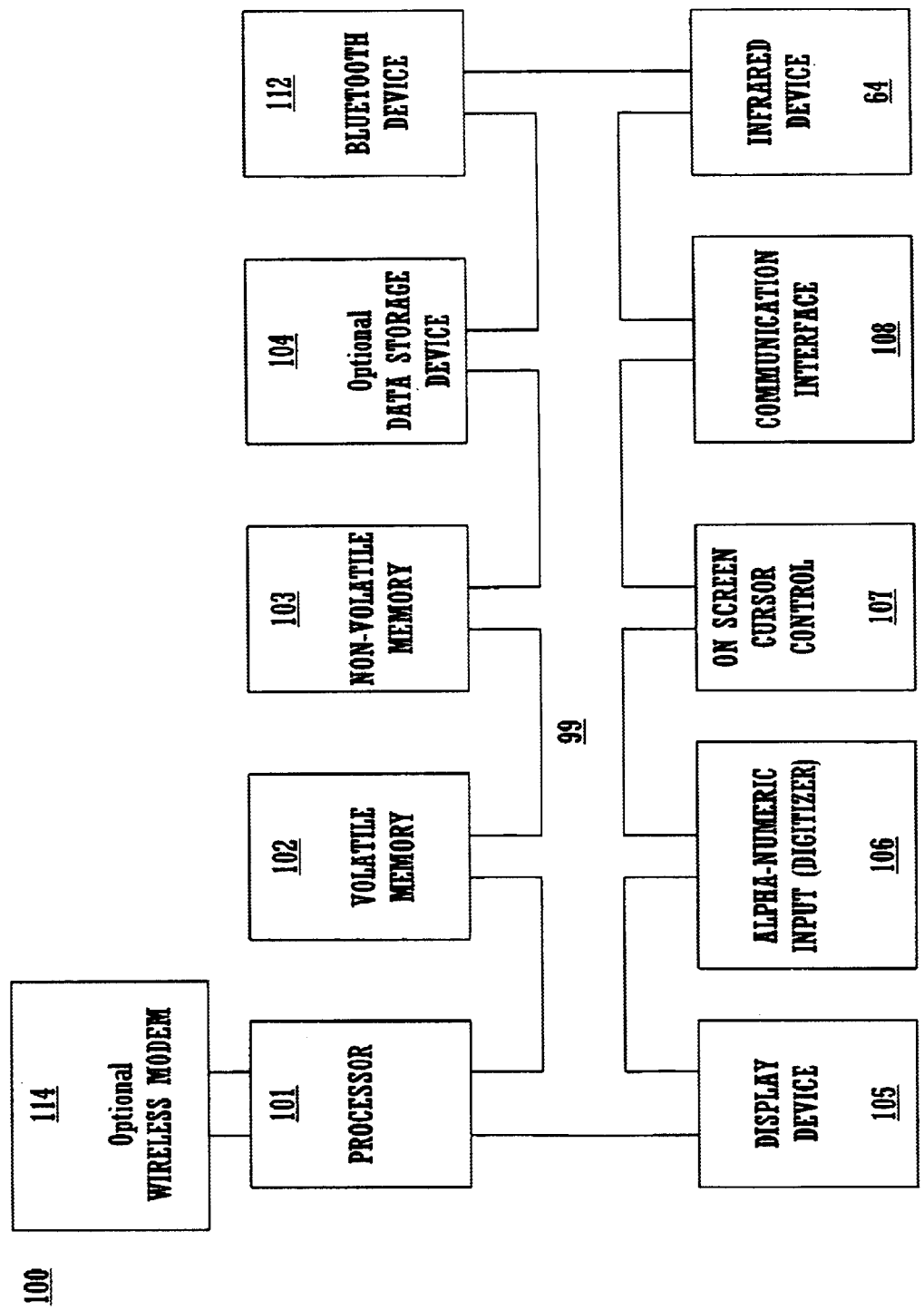

800

```
┌─────────────────────────────────────────────────────────┐
│ DETERMINE CHARGE WITHIN RECHARGEABLE POWER SUPPLY OF    │
│              PORTABLE COMPUTER SYSTEM                   │
│                         801                             │
└─────────────────────────────────────────────────────────┘
                            ▼
┌─────────────────────────────────────────────────────────┐
│ DETERMINE CHARGE WITHIN RECHARGEABLE POWER SUPPLY OF    │
│                  PERIPHERAL DEVICE                      │
│                         802                             │
└─────────────────────────────────────────────────────────┘
                            ▼
┌─────────────────────────────────────────────────────────┐
│   DETERMINE OPERATING TIME FOR PORTABLE COMPUTER SYSTEM │
│                         803                             │
└─────────────────────────────────────────────────────────┘
                            ▼
┌─────────────────────────────────────────────────────────┐
│       DETERMINE OPERATING TIME FOR PERIPHERAL DEVICE    │
│                         804                             │
└─────────────────────────────────────────────────────────┘
                            ▼
┌─────────────────────────────────────────────────────────┐
│   CHARGE PORTABLE COMPUTER SYSTEM OR PERIPHERAL DEVICE  │
│                         805                             │
└─────────────────────────────────────────────────────────┘
```

FIGURE 8

POWER SHARING BETWEEN PORTABLE COMPUTER SYSTEM AND PERIPHERAL DEVICE

BACKGROUND OF THE INVENTION

1. Field of the Invention

The present invention relates to the field of computer systems. More specifically, embodiments of the present invention relate to a method and apparatus for supplying power to a portable computer system and to a peripheral device.

2. Related Art

As the components required to build a computer system have reduced in size, new categories of computer systems have emerged. One of the new categories of portable computer systems is the "palmtop" computer system. A palmtop portable computer system is a computer that is small enough to be held in the hand of a user and can be "palm-sized." Most palmtop computer systems are used to implement various Personal Information Management (PIM) applications such as an address book, a daily organizer and electronic notepads, to name a few.

Because of the limited size of palmtop portable computer systems, battery power is typically limited to one or two AAA or smaller batteries. This limits the operations that can be performed by the palmtop portable computer system.

The latest generations of palmtop portable computer systems are enhanced with the capability of coupling to a variety of peripheral devices. This gives their user access to a large amount of additional features. However, peripheral devices often use quite a lot of power. Therefore, many peripheral devices often include their own power source such as, for example, rechargeable batteries.

The use of a portable computer system and a peripheral device that is connected to the portable computer system can be limited by either the batteries in the peripheral device running out of charge or the batteries in the portable computer system running out of charge. In many instances the batteries in the peripheral device run out before the batteries in the portable computer system. The user must then discontinue usage of the peripheral device, even when there is significant charge left in the batteries of the portable computer system. Also, the batteries in the portable computer system can run out before the batteries in the peripheral device. The user must then discontinue usage of the portable computer system, even when there is significant charge left in the batteries of the peripheral device.

What is needed is a method and apparatus for controlling operating time of a portable computer system and a peripheral device. Also, a method and apparatus is needed that maximizes operating time of the portable computer system and the peripheral device.

SUMMARY OF THE INVENTION

The method and apparatus of the present invention allows for controlling operating time of a portable computer system and a peripheral device. Also, the method and apparatus of the present invention allows for maximization of operating time of the portable computer system and the peripheral device.

A portable computing system is disclosed that includes a rechargeable power supply. The portable computing system also includes a connection mechanism for coupling to a peripheral device having a rechargeable power supply. The portable computing system also includes a charging control module coupled to the rechargeable power supply and coupled to the connection mechanism that includes logic for determining the operating time for the portable computer system and for the peripheral device. The charging control module is operable for charging either the rechargeable power supply of the peripheral device or the rechargeable power supply of said portable computer system so as to control the operating time for the portable computer system and the peripheral device.

A peripheral device is disclosed that includes a rechargeable power supply. The portable computing system also includes a connection mechanism for coupling to the connection mechanism of the portable computer system. A boost circuit that is coupled to the rechargeable power supply and that is coupled to the connection mechanism, increases the voltage from the rechargeable power supply of the peripheral device to a voltage sufficient to charge the rechargeable power supply of the portable computer system. A boost charging circuit that is also coupled to the rechargeable power supply and coupled to the connection mechanism increases voltage received from the portable computer system to a voltage sufficient to charge the rechargeable power supply of the peripheral device. In the present embodiment the peripheral device also includes a controller that is operable upon receiving instructions from the portable computer system to cause the boost circuit to send power to the portable computer system.

A method for controlling the operating time of a portable computer system and a peripheral device that is coupled to the portable computer system is disclosed. Charge within the rechargeable power supply of the portable computer system and charge within the rechargeable power supply of the peripheral device is determined. The determined charge for the portable computing system and for the peripheral device is then used to determine operating time for the portable computing device and operating time for the peripheral device. Operating time is an indication of the amount of time that the device will continue to operate given its remaining battery charge.

In one embodiment, a pop-up menu is displayed on the display screen of the personal computing system that allows the user to select a desired option (e.g., maximizing operating time of the portable computer, maximizing operating time of the peripheral device, or maximizing the life of the entire system). In the present embodiment, this pop-up menu is displayed when power is determined to be low in either the portable computing system or in the peripheral device.

When operating time of the portable computer system is to be maximized, power is sent from the peripheral device to the portable computer system to extend the operating time of the portable computer system. Similarly, when operating time of the peripheral device is to be maximized, power is sent from the rechargeable power supply of the portable computer system to the peripheral device to extend the operating time of the peripheral device.

When operating time of the entire system is to be maximized, power is moved such that the operating time for the portable computer system is equal to the operating time of the peripheral device. Thereby the operating time for the portable computing system and the peripheral device together are maximized.

Accordingly, the method and apparatus of the present invention allows for controlling operating time of a portable computer system and a peripheral device. Also, the method and apparatus of the present invention allows for maximization of operating time of the portable computer system and the peripheral device. Moreover, a user can maximize operating time of one component, either the operating time of the portable computer system or the peripheral device.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 3 is a block diagram of exemplary circuitry of a portable computing system in accordance with one embodiment of the present invention.

FIG. 8 is a flow chart that illustrates a method for controlling the operating time of a portable computer system and a peripheral device in accordance with one embodiment of the present invention.

The drawings referred to in this description should not be understood as being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Although the method and apparatus for power sharing between a portable computing device and a peripheral device of the present invention may be implemented with a variety of different electronic systems such as a pager, a mobile phone, a calculator, a personal digital assistant (PDA), etc., one exemplary embodiment includes the use of a portable computing system and a peripheral device. It should be understood that the descriptions corresponding to FIGS. 1–4 provide some general information about an exemplary portable computing system.

Figure 1:
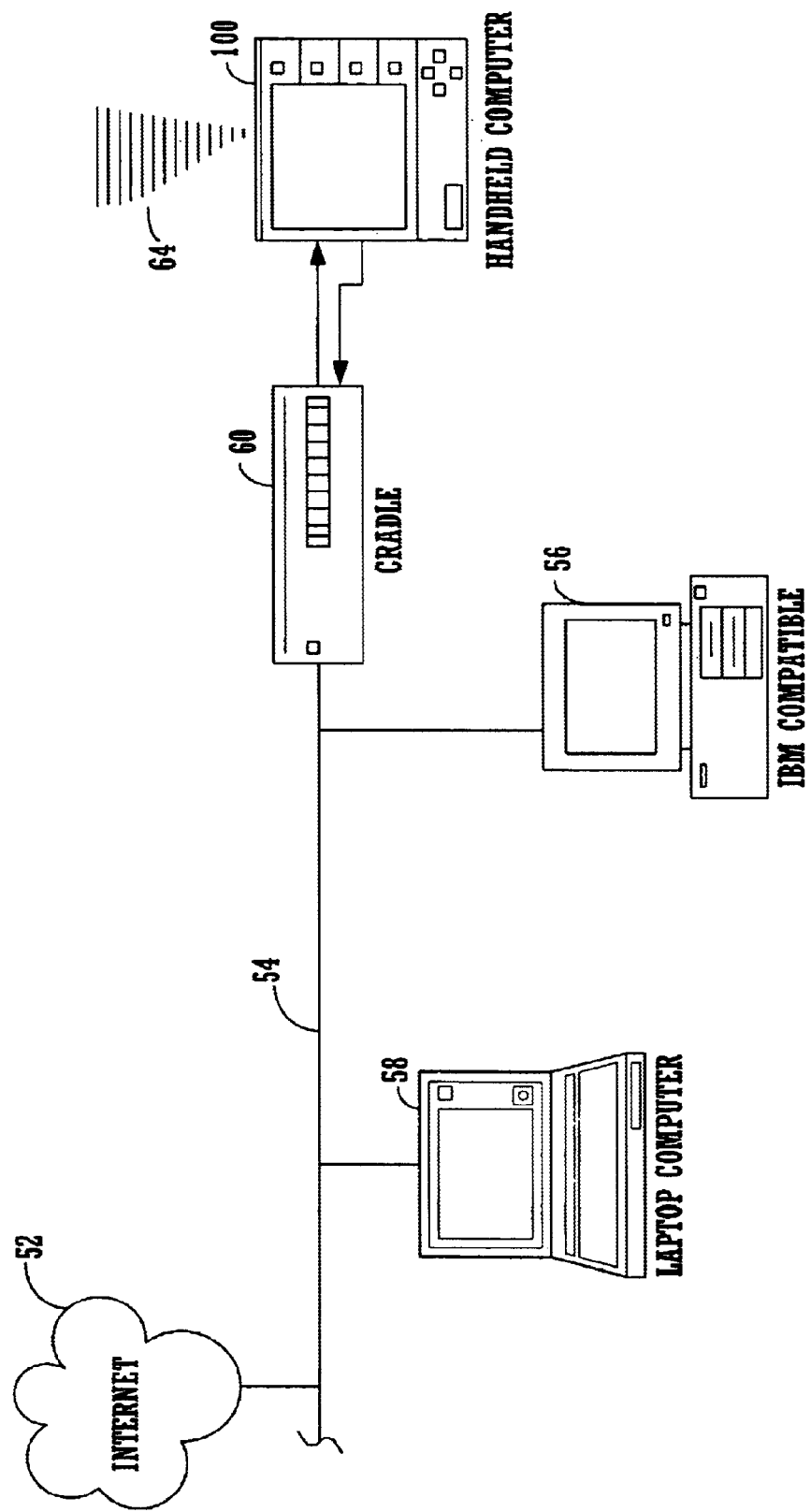
FIG. 1 is a system illustration of a portable computing system connected to other computer systems and the Internet via a cradle device.

FIG. 1 illustrates a system 50 that may be used in conjunction with an exemplary portable computing device 100. Specifically, system 50 comprises a host computer system 56 which can either be a desktop unit as shown, or, alternatively, can be a laptop system 58. Optionally, one or more host computer systems can be used within system 50. Host computer systems 56 and 58 are shown connected to a communication bus 54, which in one embodiment can be a serial communication bus, but could be of any of a number of well known communication standards and protocols, e.g., a parallel bus, Ethernet, Local Area Network (LAN), and the like. Optionally, bus 54 can provide communication with the Internet 52 using a number of well known protocols.

Bus 54 is also coupled to a cradle 60 for receiving and initiating communication with portable computing device 100. Cradle 60 provides an electrical and mechanical communication interface between bus 54 (and anything coupled to bus 54) and the portable computer system 100 for two-way communications. Computer system 100 also contains a wireless infrared communication mechanism 64 for sending and receiving information from other devices.

Figure 2A:
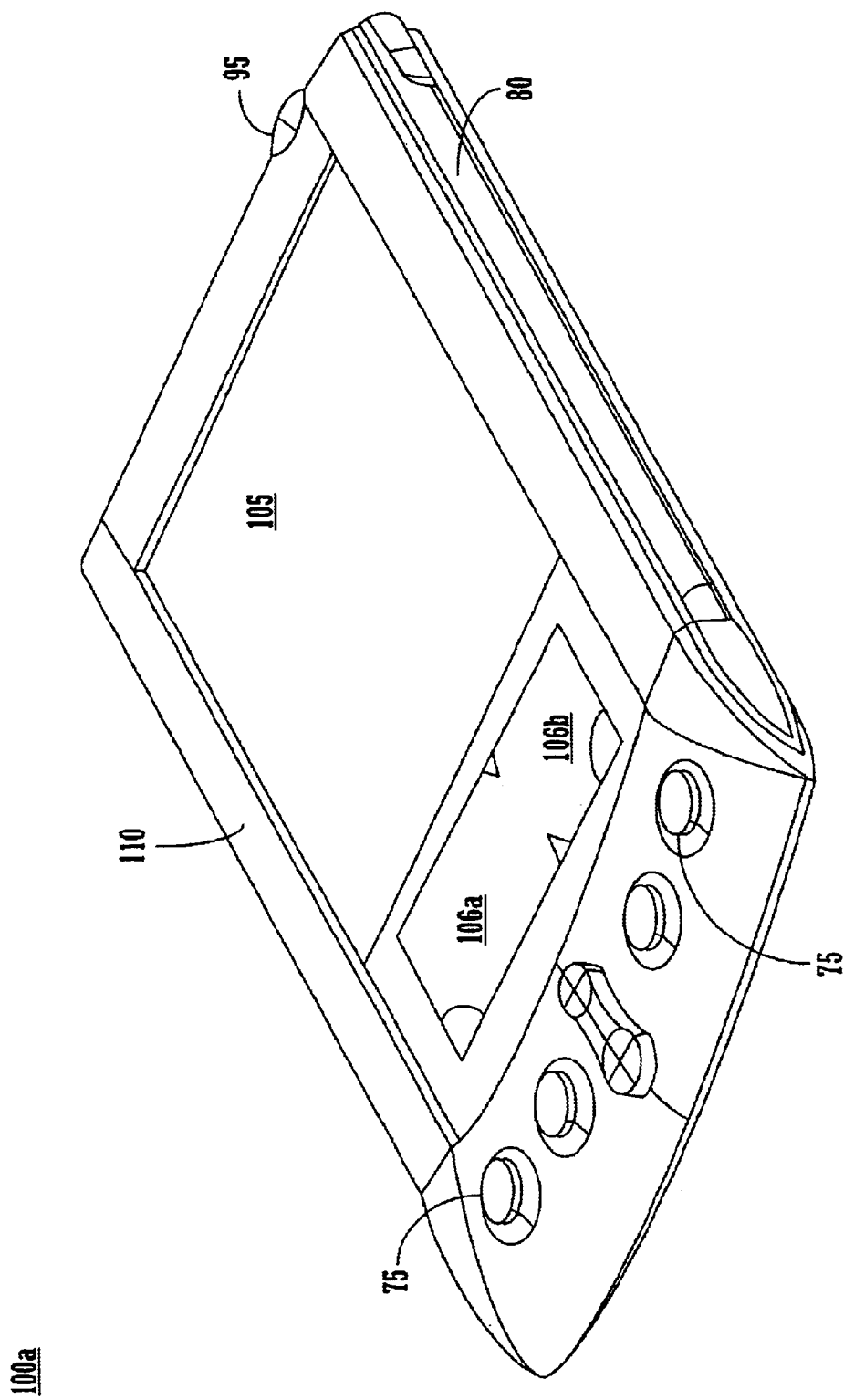
FIG. 2A is a perspective illustration of the top face of an exemplary portable computer system.

FIG. 2A is a perspective illustration of the top face 100*a* of an exemplary portable computer system 100 which is a handheld or "palmtop" computer system that is small enough to fit into a user's hand. The top face 100*a* contains a display screen 105 surrounded by a top cover 110. A removable stylus 80 is also shown. The display screen 105 is a touch screen able to register contact between the screen and the tip of the stylus 80. Additionally, the stylus 80 can be fabricated of any material to make contact with the screen 105. The top face 100*a* also contains one or more dedicated and/or programmable buttons 75 for selecting Information and causing the computer system 100 to implement functions. The on/off button 95 is also shown.

FIG. 2A also illustrates a handwriting recognition pad or "digitizer" containing two regions 106*a* and 106*b*. For example, region 106*a* is for the drawing of alpha characters therein for automatic recognition while region 106*b* is for the drawing of numeric characters therein for automatic recognition. The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 2B:
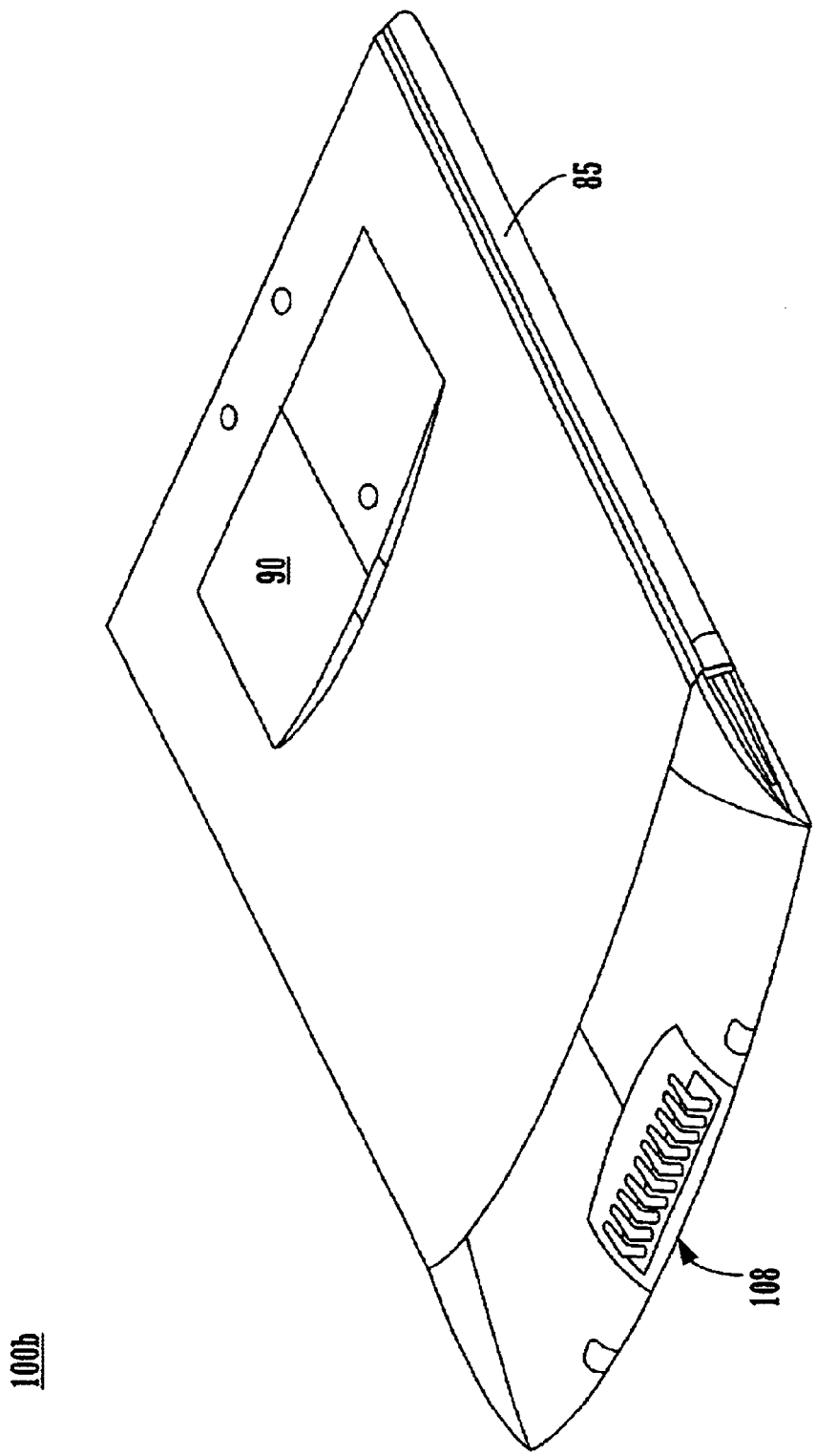
FIG. 2B is a perspective illustration of one embodiment of a bottom side of the portable computer system of FIG. 2A.

FIG. 2B is a perspective illustration of one embodiment of a bottom side 100*b* of portable computer system 100. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, small computer system interface (SCSI), Ethernet, FireWire (IEEE 1394), Universal Serial Bus (USB), etc.

FIG. 3 is a block diagram of exemplary circuitry of portable computing system 100 in accordance with one embodiment of the present invention. The portable computer system 100 includes an address/data bus 99 for communicating information, and a central processor 101 coupled with the bus 99 for processing information and instructions. It is appreciated that central processor unit 101 may be a microprocessor or any other type of processor. The computer system 100 also includes data storage features such as a volatile memory 102 (e.g., random access memory, static RAM, dynamic RAM, etc.) coupled with the bus 99 for storing information and instructions for the central processor 101 and a non-volatile memory 103 (e.g., read only memory, programmable ROM, flash memory, EPROM, EEPROM, etc.) coupled with the bus 99 for storing static information and instructions for the processor 101. Computer system 100 may also include an optional data storage device 104 (e.g., thin profile removable memory) coupled with the bus 99 for storing information and instructions. It should be understood that device 104 may be removable. Furthermore, device 104 may also be a secure digital (SD) card reader or equivalent removable memory reader.

Also included in portable computer system 100 of FIG. 3 is an alphanumeric input device 106 which in one implementation is a handwriting recognition pad ("digitizer") and may include integrated push buttons in one embodiment. Device 106 can communicate information (spatial data and pressure data) and command selections to the central processor 101. The digitizer 106 records both the (x, y) coordinate value of the current location of the stylus 80 and also simultaneously records the pressure that the stylus 80 exerts on the face of the digitizer pad 106. The coordinate values (spatial information) and pressure data are then output on separate channels for sampling by the processor 101. In one implementation, there are roughly 256 different discrete levels of pressure that can be detected by the digitizer 106. Since the digitizer's channels are sampled serially by the processor 101, the stroke spatial data are sampled "pseudo" simultaneously with the associated pressure data. The sampled data is then stored in a memory by the processor 101 for later analysis.

System 100 of FIG. 3 also includes an optional cursor control or directing device 107 coupled to the bus 99 for communicating user input information and command selections to the central processor 101. In one implementation, device 107 is a touch screen device (also a digitizer) incorporated with display screen 105. Device 107 is capable of registering a position on the screen 105 where the stylus 80 makes contact. The digitizer of 106 or 107 may be implemented using well known devices, for instance, using the ADS-7846 device by Burr-Brown that provides separate channels for spatial stroke information and pressure information.

Computer system 100 also contains a display device 105 coupled to the bus 99 for displaying information to the computer user. The display device 105 utilized with the computer system 100 may be a liquid crystal device (LCD), cathode ray tube (CRT), field emission device (FED, also called flat panel CRT), plasma or other display technology suitable for creating graphic images and/or alphanumeric characters recognizable to the user. In one embodiment, the display device 105 is a flat panel multi-mode display capable of both monochrome and color display modes.

Also included in computer system 100 of FIG. 3 is a signal communication interface device 108 coupled to bus 99 that may be a serial port (or USB port) for enabling system 100 to communicate with the cradle 60 and with other devices and systems. As mentioned above, in one embodiment, the communication interface 108 is a serial communication port, but could also alternatively be of any of a number of well known communication standards and protocols, e.g., parallel, SCSI, Ethernet, FireWire (IEEE 1394), USB, etc. In addition to device 108, wireless communication links can be established between the device 100 and a host computer system (or another portable computer system) using a Bluetooth wireless device 112, an infrared (IR) device 64, or a Global System for Messaging (GSM) radio device 114. System 100 may also include a wireless modem device 114 and/or a wireless radio, e.g., a GSM wireless radio with supporting chip set. The wireless modem device 114 is coupled to communicate with the central processor 101 but may not be directly coupled to port 108.

In one implementation, the Mobitex wireless communication system may be used to provide two way communications between computer system 100 and other networked computers and/or the Internet (e.g., via a proxy server). In other embodiments, transmission control protocol (TCP) can be used or Short Message Service (SMS) can be used. System 100 of FIG. 3 may also contain batteries (not shown) for providing electrical power.

Figure 4:
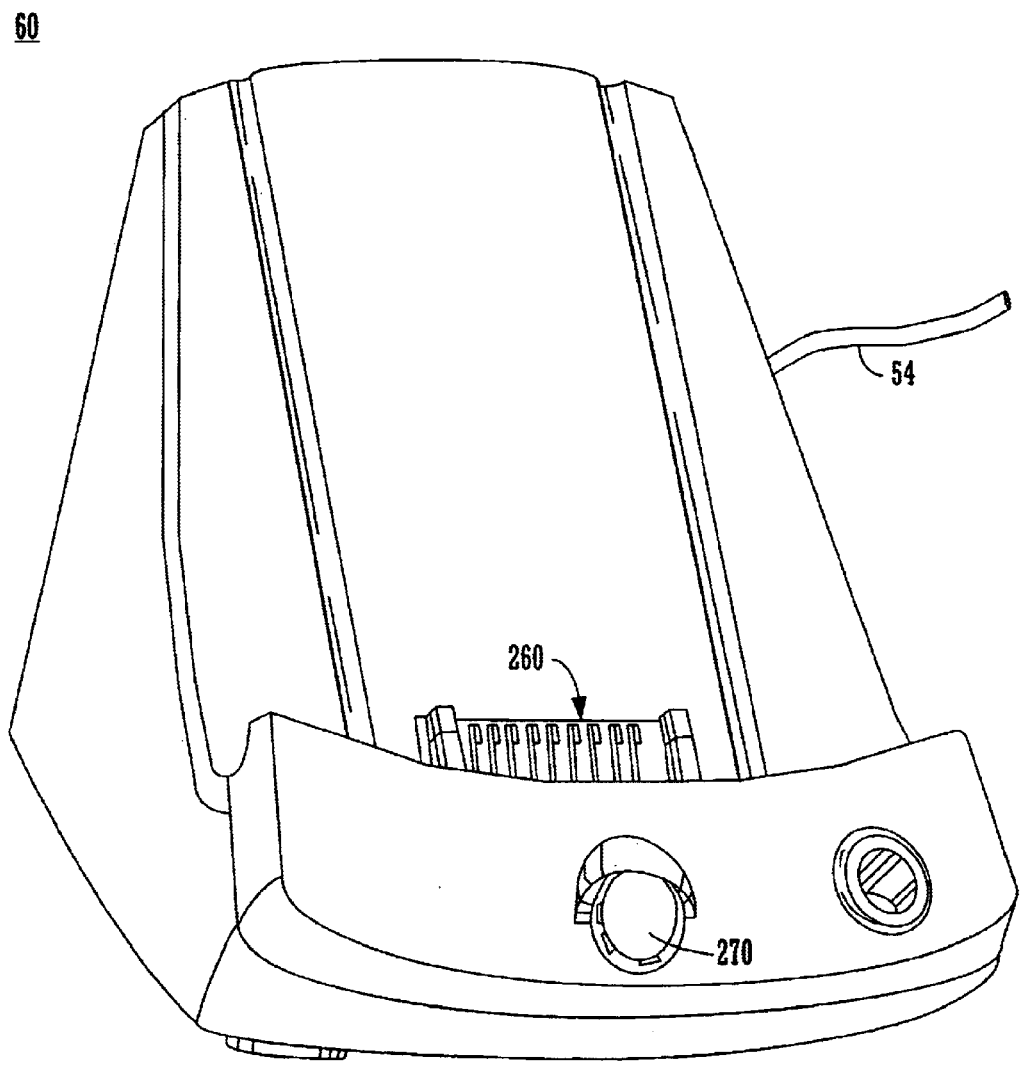
FIG. 4 is a perspective view of the cradle device for connecting the portable computing system to other systems via a communication interface.

FIG. 4 is a perspective illustration of one embodiment of a cradle 60 for receiving portable computer system 100. The cradle 60 contains a mechanical and electrical interface 260 for interfacing with communication interface 108 (as shown in FIG. 2B) of computer system 100 when computer system 100 is slid into the cradle 60 in an upright position. Once inserted, button 270 can be pressed to initiate two-way communication between portable computer system 100 and other computer systems (e.g., 56 and 58) coupled to communication bus 54.

Figure 5:
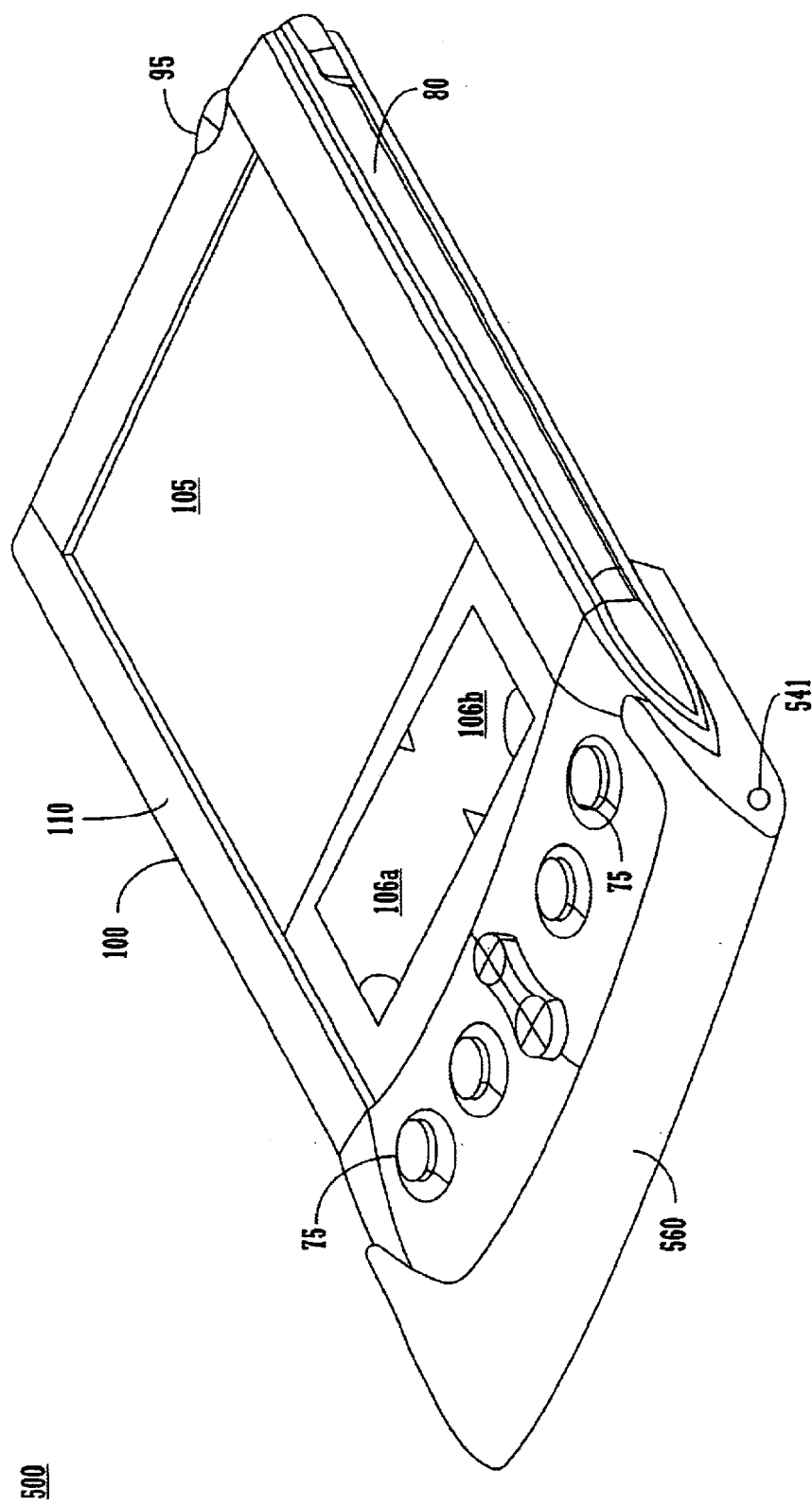
FIG. 5 is a perspective view of a system that includes a portable computer system and a peripheral device in accordance with one embodiment of the present invention.

Referring now to FIG. 5, a system 500 is shown that includes portable computer system 100 to which peripheral device 560 is attached. Peripheral device 560 can be any type of peripheral device that provides additional functionality to portable computer system 100. For example, peripheral device 560 can include a position determination system (e.g., a Global Positioning System (GPS) device), a remote battery pack, a cellular telephone, a pager, a radio, etc.

Continuing with FIG. 5, in the present embodiment a serial connector on portable computer system 100 (e.g., serial connector 108 shown in FIG. 2B) and a corresponding serial connector receptacle located on peripheral device 560 (not shown) are used to electrically couple portable computer system 100 to peripheral device 560.

In one embodiment, peripheral device 560 includes a connector receptacle 541 that receives a corresponding connector for charging peripheral device 560. In one embodiment, connector receptacle 541 is a barrel-style connector receptacle that receives a barrel connector for charging peripheral device 560. The charging device that is used to charge peripheral device 560 (not shown) can be a car adapter, a plug-in charger that plugs into a conventional wall outlet, etc.

It is appreciated that peripheral device 560 is removable and that peripheral device 560 can be easily attached and detached from portable computer system 100. When peripheral device 560 is disconnected from portable computer system 100, peripheral device 560 could also be charged by use of a charger that couples to the serial connector receptacle of peripheral device 560.

Figure 6:
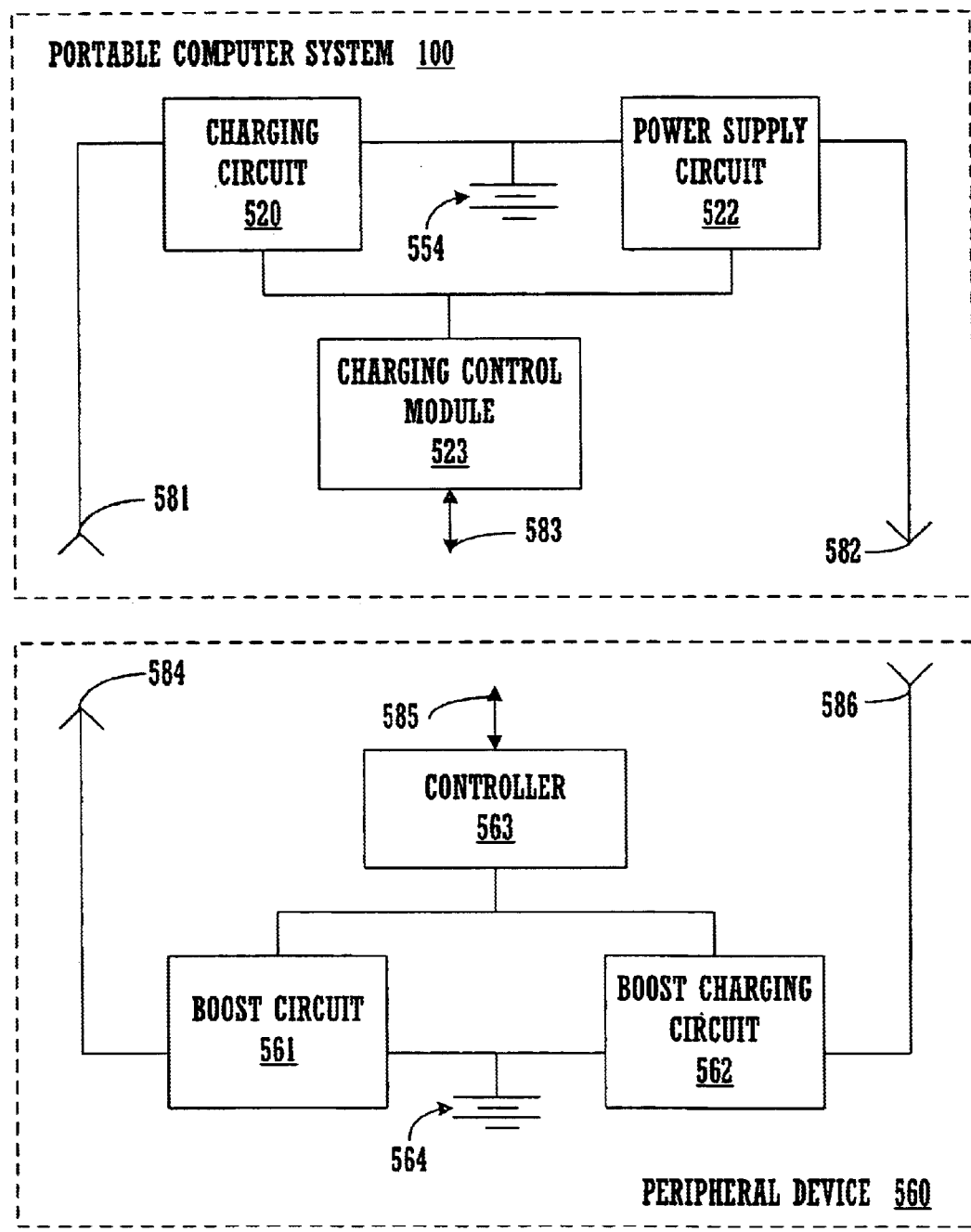
FIG. 6 is a block diagram of exemplary circuitry of a system that includes a portable computer system and a peripheral device in accordance with one embodiment of the present invention.

FIG. 6 shows a diagram that illustrates some of the circuitry of system 500. Portable computer system 100 includes power-in point 581 that receives power for charging rechargeable power supply 554 using charging circuit 520. In one embodiment, power-in point 581 is a dedicated pin of a serial connector. However, other connection mechanisms could also be used. In the present embodiment, charging circuit 520 includes circuitry for charging rechargeable power supply 554.

In the present embodiment, rechargeable power supply 554 is a rechargeable lithium-ion battery. However, any of a number of other types of rechargeable power sources could be used such as, for example, other types of rechargeable batteries. In the present embodiment, rechargeable power supply 554 operates at 3.5 Volts (from 3.1 Volts to 3.7 Volts) and charging circuit 520 is operable upon receiving power having 5 or more Volts to recharge rechargeable power supply 554.

Portable computer system 100 includes power supply circuit 522 that is electrically coupled to rechargeable power supply 554 and to power-out point 582. Power supply circuit 522 includes circuitry for controlling the flow of power to power-out point 582 in response to input from charging control module 523. Power-out point 582 outputs power for charging peripheral device 560. In one embodiment, power-out point 582 is a dedicated pin of a serial connector. However, other connection mechanisms could also be used.

Continuing with FIG. 6, charging control module 523 is electrically coupled to both charging circuit 520 and power supply circuit 522. Charging control module 523 controls charging functions. In the present embodiment charging control module 523 is implemented as programming that is stored in non-volatile memory 103 (e.g., a program within the palm operating system). However, the functions of charging control module 523 could also be implemented in hardware.

Peripheral device 560 of FIG. 6 includes power-in point 586 that receives power for charging rechargeable power supply 564 using boost charging circuit 562. In one embodiment, power-in point 586 is a dedicated receptacle of a serial connector receptacle that electrically couples to pin 582 of portable computing device 100. However, other connection mechanisms could also be used.

In the present embodiment, rechargeable power supply 564 is a rechargeable lithium-ion battery. However, any of a number of other types of rechargeable power sources could be used such as, for example, other types of rechargeable batteries.

Continuing with FIG. 6, boost charging circuit 562 includes circuitry for boosting voltage and charging rechargeable power supply 564. In the present embodiment, rechargeable power supply 564 operates at 3.5 Volts and boost charging circuit 562 is operable upon receiving power having a Voltage of less than 5 Volts (e.g., 3.5 Volts received from portable computing device 100) to increase the Voltage to 5 or more Volts for recharging rechargeable power supply 564.

Boost circuit 561 is electrically coupled to rechargeable power supply 564 and to power-out point 584. In one embodiment, boost circuit 561 includes charging circuitry for boosting voltage in response to input received from controller 563. In the present embodiment, boost circuit 561 increases the voltage from rechargeable power supply 564 to a voltage sufficient to charge rechargeable power supply 554 of portable computing device 100. In the present embodiment, rechargeable power supply 564 operates at 3.5 Volts and boost circuit 561 increases the Voltage to 5 or more Volts.

Power-out point 584 outputs power for charging portable computer system 100. In one embodiment, power-out point 584 is a dedicated receptacle of a serial connector receptacle that electrically couples to pin 581 of portable computer system 100. However, other connection mechanisms could also be used.

Continuing with FIG. 6, controller 563 is electrically coupled to boost circuit 561 and boost charger circuit 562. Controller 563 controls the operations of peripheral device 560 including charging functions. In the present embodiment controller 563 is an Application Specific Integrated Circuit (ASIC) device. However, alternatively, controller 563 can be implemented in other types of hardware or software.

Controller 563 is electrically coupled with charging control module 523 for receiving instructions and communicating information to charging control module 523. In the present embodiment, communication between controller 563 and charging control module 523 is via a serial connection mechanism. In one embodiment, the serial connection mechanism includes one or more pin 583 that mates with one or more corresponding pin receptacle 585 on peripheral device 560.

In the present embodiment, charging control module 523 includes logic for determining the operating time for portable computer system 100 and for determining the operating time for peripheral device 560. Charging control module 523 is operable for charging either rechargeable power supply 564 of peripheral device 560 or charging rechargeable power supply 554 of portable computer system 100 so as to control the operating time for portable computer system 100 and peripheral device 560.

Figure 7:
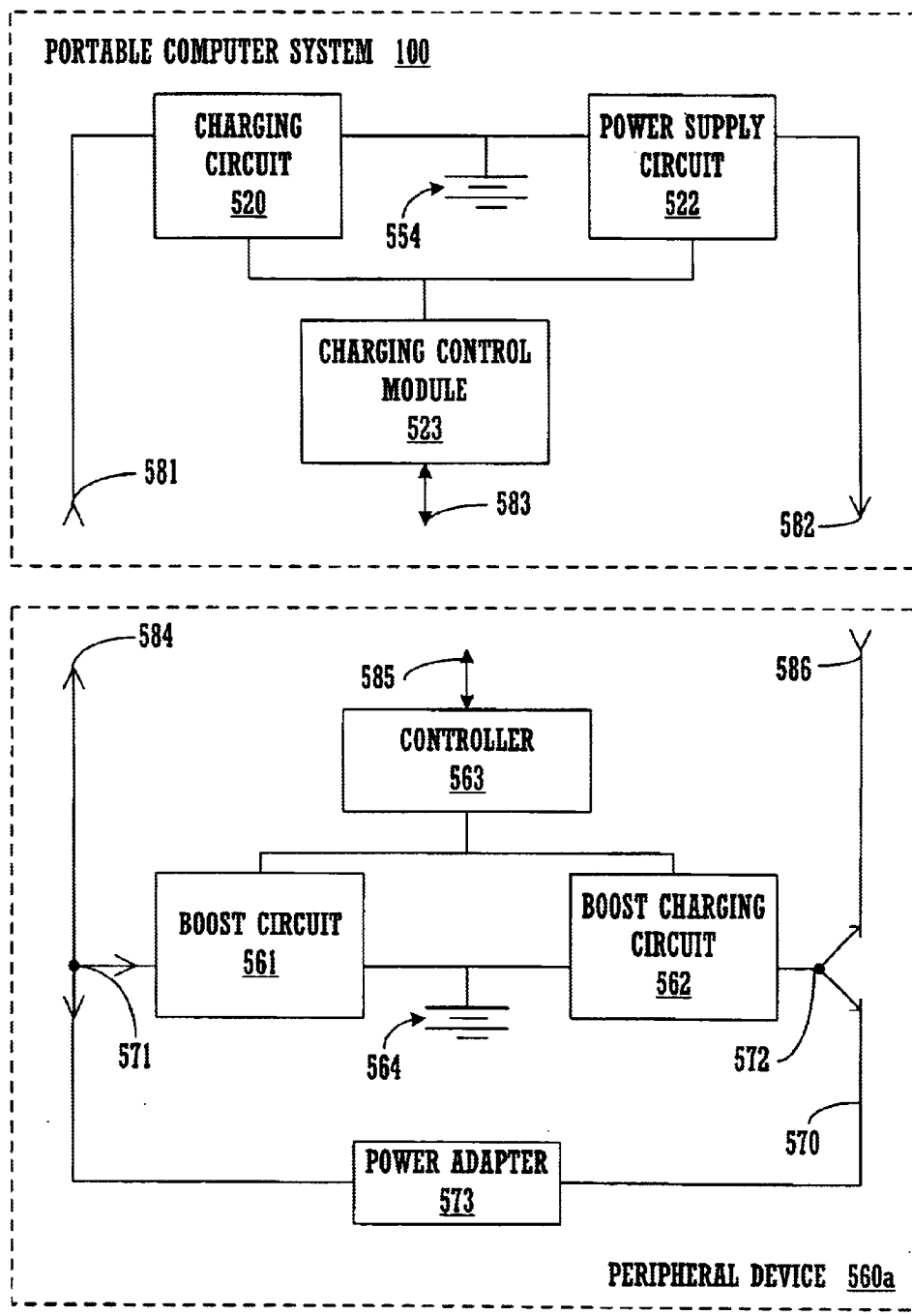
FIG. 7 is a block diagram of exemplary circuitry of a system that includes a portable computer system and a peripheral device that includes a power-adapter charging circuit for charging the peripheral device using an external power source that does not couple to the serial connector of the peripheral device in accordance with one embodiment of the present invention.

FIG. 7 shows an embodiment in which peripheral device 560a includes a separate power-adapter charging circuit 570 that does not require connection to the serial connection receptacle (that mates with portable computing system 100) for charging rechargeable power supply 564 of peripheral device 560. In the embodiment shown in FIG. 5, power-adapter charging circuit 570 includes connection mechanism 541 that is coupled to power-adapter 573 for providing power to peripheral device 560.

Continuing with FIG. 7, peripheral device 560a includes switch 571 that couples power-out point 584 to either boost circuit 561 or to power-adapter charging circuit 570. Similarly, switch 572 is operable to either couple boost charging circuit 562 to power-adapter charging circuit 570 or to or to power-in point 586.

In the present embodiment, switches 571–572 are operable upon receiving input from controller 563 to either electrically couple power-adapter charging circuit 570 to rechargeable power supply 564 or to electrically couple points 584 and 586 to rechargeable power supply 564. This allows for charging rechargeable power supply 564 using power supplied through power-adapter charging circuit 570 (e.g., an automotive charger, a plug-in wall outlet charger, etc.) or using power supplied through input/output points 584 and 586.

FIG. 8 shows a method 800 for controlling the operating time of a portable computer system and a peripheral device that is coupled to the portable computer system. As shown by step 801, the charge within a rechargeable power supply of the portable computer system is determined. In the embodiment shown in FIGS. 6–7, charger control module 523 is operable to determine the charge remaining in rechargeable power supply 554.

The charge within the rechargeable power supply of the peripheral device is determined as shown by step 802. In one embodiment, charging control module 523 of FIGS. 6–7 sends instructions to controller 563. In response, controller 563 determines the charge of rechargeable power supply 564. Controller 563 then communicates the charge of rechargeable power supply 564 to charger control module 523.

Operating time for the portable computing system is determined as shown by step 803. In the present embodiment, the amount of charge within the rechargeable power supply of the portable computing system that was determined in step 801 is used for determining operating time for the portable computer system. In the embodiment shown in FIGS. 6–7, charger control module 523 is operable to determine the operating time for portable computing system 100. In one embodiment, operating time is an indication of the amount of time that portable computer system 100 will continue to operate using an estimated power consumption level. The estimated power consumption level can be a fixed value that is stored in the personal computer system. Alternatively, the estimated power consumption level can be determined by analysis of recent power consumption by portable computer system 100.

Operating time for the peripheral device is determined as shown by step 804. In the present embodiment, the amount of charge within the rechargeable power supply of the peripheral device that was determined in step 802 is used for determining operating time for the peripheral device. In one embodiment, operating time is an indication of the amount of time that the peripheral device will continue to operate using an estimated power consumption level. The estimated power consumption level can be a fixed value that is stored in either the portable computer system or the peripheral device. Alternatively, the estimated power consumption level can be determined by analysis of recent power consumption by the peripheral device.

In the embodiment shown in FIGS. 6–7, charger control module 523 is operable to determine the operating time for peripheral device 560. Alternatively, controller 563 is operable to determine operating time and communicate the determined operating time to portable computing device 100.

In one embodiment, controller 563 is operable to both determine charge within rechargeable power supply 564 of peripheral device 580 (step 802) and to determine operating time for peripheral device 560 (step 804). In this embodiment, charging control module 523 sends instructions to controller 563 that cause controller 563 to determine charge (step 802) and to determine operating time (step 804). Controller 563 then sends a response to control module 523 that indicates the charge of peripheral device 560.

Either the rechargeable power supply of the peripheral device or the rechargeable power supply of the portable computer system is charged to provide the desired operating time as shown by step 805. In the embodiment shown in FIGS. 6–7, when portable computer system 100 is to be charged, charging control module 523 sends instructions to controller 563 instructing controller 563 to cause boost circuit 561 to send power to portable computer system 100. Boost circuit 561 then boosts the voltage to a voltage level sufficient for charging rechargeable power supply 554 (e.g., a voltage of 5 or more Volts) and power is sent via power-out point 584 to power-in point 581. The power is then coupled from power-in point 581 to charging circuit 520 that is operable to charge rechargeable power supply 554.

In the embodiment shown in FIGS. 6–7, when peripheral device 560 is to be charged, charging control module 523 provides input to power supply circuit 522 that causes power supply circuit 522 to couple power to power-out point 582. The received power is coupled through power-in point 586 to boost charging circuit 562. Boost charging circuit 562 then boosts the voltage to a voltage level sufficient for charging rechargeable power supply 564 (e.g., a voltage of 5 or more Volts) and recharges rechargeable power supply 564.

In one embodiment, user input is used to determine whether the operating time of the portable computer system or the operating time of the peripheral device is to be extended. In the present embodiment, a user can choose between maximizing the operating time of the portable computer, maximizing the operating time of the peripheral device, or maximizing the life of the entire system (maximizing the operating time of the portable computer system and the peripheral device).

In the embodiment shown in FIGS. 2–4, the digitizer of devices 106 or 107 is used to receive user input. In one embodiment, a pop-up menu is displayed on display screen 105 that allows the user to select a desired option (e.g., maximizing operating time of the portable computer, maximizing operating time of the peripheral device, or maximizing the operating time of the entire system).

In one embodiment, when the charge is determined to be low within either the rechargeable power supply of the portable computing system 100 or the rechargeable power supply of the peripheral device 560, a pop-up menu is displayed that indicates that power is low. The user is then prompted to choose between maximizing operating time of the portable computer system, maximizing operating time of the peripheral device, or maximizing the operating time of the entire system.

When operating time of the portable computer system is to be maximized, power is sent from the peripheral device to the portable computer system to extend the operating time of the portable computer system. Similarly, when operating time of the peripheral device is to be maximized, power is sent from the rechargeable power supply of the portable computer system to the peripheral device to extend the operating time of the peripheral device.

When operating time of the entire system is to be maximized (operating time of both the portable computer system and the peripheral device are to be maximized), power is moved such that the operating time for the portable computer system is equal to the operating time of the peripheral device. In the present embodiment, the rechargeable power supply of the portable computer system is charged when the determined operating time for the peripheral device is greater than the determined operating time for the portable computer system. Similarly, the rechargeable power supply of the peripheral device is charged when the determined operating time for the portable computer system is greater than the determined operating time for the peripheral device.

The preferred embodiment of the present invention, a method and apparatus for controlling the operating time of a portable computer system and a peripheral device, is thus described. While the present invention has been described in particular embodiments, it should be appreciated that the present invention should not be construed as limited by such embodiments, but rather construed according to the below claims.

What is claimed is:

1. A portable computer system comprising:
   a connection mechanism for coupling to a peripheral device;
   a rechargeable power supply coupled to said connection mechanism; and a charging control module coupled to said rechargeable power supply and coupled to said connection mechanism, said charging control module including logic for determining the operating time for said portable computer system and for determining the operating time for said peripheral device, said charging control module operable for charging one of a rechargeable power supply of said peripheral device and said rechargeable power supply of said portable computer system so as to control the operating time for said portable computer system and said peripheral device.

2. The portable computer system of claim 1 further comprising:

a charging circuit coupled to said power supply and coupled to said connection mechanism, said charging circuit operable to charge said power supply when power is supplied to said connection mechanism.

3. The portable computer system of claim 1 further comprising:

a power supply circuit coupled to said power supply and coupled to said connection mechanism, said power supply circuit electrically coupled to said charging control module and operable in response to input from said charging control module for coupling power from said rechargeable power supply to said connection mechanism for charging said peripheral device.

4. The portable computer system of claim 3 wherein said connection mechanism comprises a first pin for receiving power, said first pin coupling power to said charging circuit for charging said rechargeable power supply, and wherein said connection mechanism includes a second pin coupled to said power supply circuit for sending power to said peripheral device.

5. The portable computer system of claim 3 wherein said portable computer system further comprises a user selection mechanism for receiving user input, said user selection mechanism including provision for allowing a user to select between maximizing operating time of said peripheral device, maximizing operating time of said portable computer system, and maximizing operating time of both said portable computer system and said peripheral device.

6. A method for controlling the operating time of a portable computer system and a peripheral device that is coupled to said portable computer system, said method comprising:

determining the charge within a rechargeable power supply of said portable computer system;

determining the charge within a rechargeable power supply of said peripheral device;

determining the operating time for said portable computer system using said determined charge within said rechargeable power supply of said portable computer system;

determining the operating time for said peripheral device using said determined charge within said rechargeable power supply of said peripheral device; and charging one of said rechargeable power supply of said peripheral device and said rechargeable power supply of said portable computer system so as to control the operating time for said portable computer system and said peripheral device.

7. The method of claim 6 wherein said rechargeable power supply of said portable computer system is charged when said determined operating time for said peripheral device is greater than said determined operating time for said portable computer system.

8. The method of claim 7 wherein said rechargeable power supply of said peripheral device is charged when said determined operating time for said portable computer system is greater than said determined operating time for said peripheral device.

9. The method of claim 6 further comprising:

providing a user selection mechanism for receiving user input, said user selection mechanism including provision for allowing a user to select between maximizing operating time of said peripheral device, maximizing operating time of said portable computer system, and maximizing operating time of both said portable computer system and said peripheral device.

10. The method of claim 6 further comprising:

when input is received indicating that operating time of said peripheral device is to be maximized, sending power from said rechargeable power supply of said portable computer system.

11. The method of claim 10 further comprising:

when input is received indicating that operating time of said portable computer system is to be maximized, instructing said peripheral device to send power to said portable computer system.

12. The method of claim 11 wherein charging one of said rechargeable power supply of said peripheral device and said rechargeable power supply of said portable computer system further comprises:

when input is received indicating that operating time of said portable computer system and said peripheral device are to be maximized, moving power such that the operating time for said portable computer system is equal to the operating time of said peripheral device.

13. The method of claim 12 wherein said portable computer system generates a low-power warning when charge of either said portable computer device or said peripheral device is low, generating a low-power warning and indicating options that can be selected by a user, said selectable options including maximizing the operating time of said portable computer system, maximizing the operating time of said peripheral device, and maximizing operating time of both said portable computer system and said peripheral device.

14. In a computer system including a processor coupled to a bus, and a memory unit coupled to the bus for storing information, a computer-implemented method for controlling the operating time of a portable computer system and a peripheral device that is coupled to said portable computer system, said method comprising:

determining the charge within a rechargeable power supply of said portable computer system;

determining the charge within a rechargeable power supply of said peripheral device;

determining the operating time for said portable computer system using said determined charge within said rechargeable power supply of said portable computer system;

determining the operating time for said peripheral device using said determined charge within said rechargeable power supply of said peripheral device; and charging one of said rechargeable power supply of said peripheral device and said rechargeable power supply of said portable computer system so as to control the operating time for said portable computer system and said peripheral device.

15. The method of claim 14 wherein said rechargeable power supply of said portable computer system is charged when said determined operating time for said peripheral device is greater than said determined operating time for said portable computer system.

16. The method of claim 15 wherein said rechargeable power supply of said peripheral device is charged when said determined operating time for said portable computer system is greater than said determined operating time for said peripheral device.

17. A peripheral device comprising:
- a connection mechanism adapted to couple to a portable computer system;
- a rechargeable power supply;
- a boost circuit coupled to said rechargeable power supply and coupled to said connection mechanism, said boost circuit for increasing the voltage from said rechargeable power supply to a voltage sufficient to charge a rechargeable power supply of a portable computer system when a portable computer system is coupled to said connection mechanism;
- a boost charging circuit coupled to said rechargeable power supply and coupled to said connection mechanism, said boost charging circuit for increasing voltage received from a portable computer system to a voltage sufficient to charge said rechargeable power supply; and
- a controller coupled to said connection mechanism for communicating with said portable computer system, said controller coupled to said boost charging circuit and coupled to said boost circuit, said controller operable upon receiving instructions from said portable computer system to cause said boost circuit to send power to said portable computer system.

18. The peripheral device of claim 17 wherein said connection mechanism comprises a first connector receptacle for receiving a first pin, said first connector receptacle receiving power through said first pin and coupling said power to said boost charging circuit for charging said rechargeable power supply.

19. The peripheral device of claim 18 wherein said connection mechanism comprises a second connector receptacle for receiving a second pin, said second connector receptacle sending power to said second pin for charging said portable computer system.

20. The peripheral device of claim 19 wherein said controller is operable to determine the charge of said rechargeable power supply and wherein said controller communicates the charge of said rechargeable power supply to said portable computer system.

21. The peripheral device of claim 20 wherein said controller is operable to determine operating time and wherein said controller communicates said determined operating time to said portable computer system.

22. The peripheral device of claim 20 further comprising a power-adapter charging circuit that can be coupled to said rechargeable power supply for charging said rechargeable power supply.

* * * * *